Figure 1:
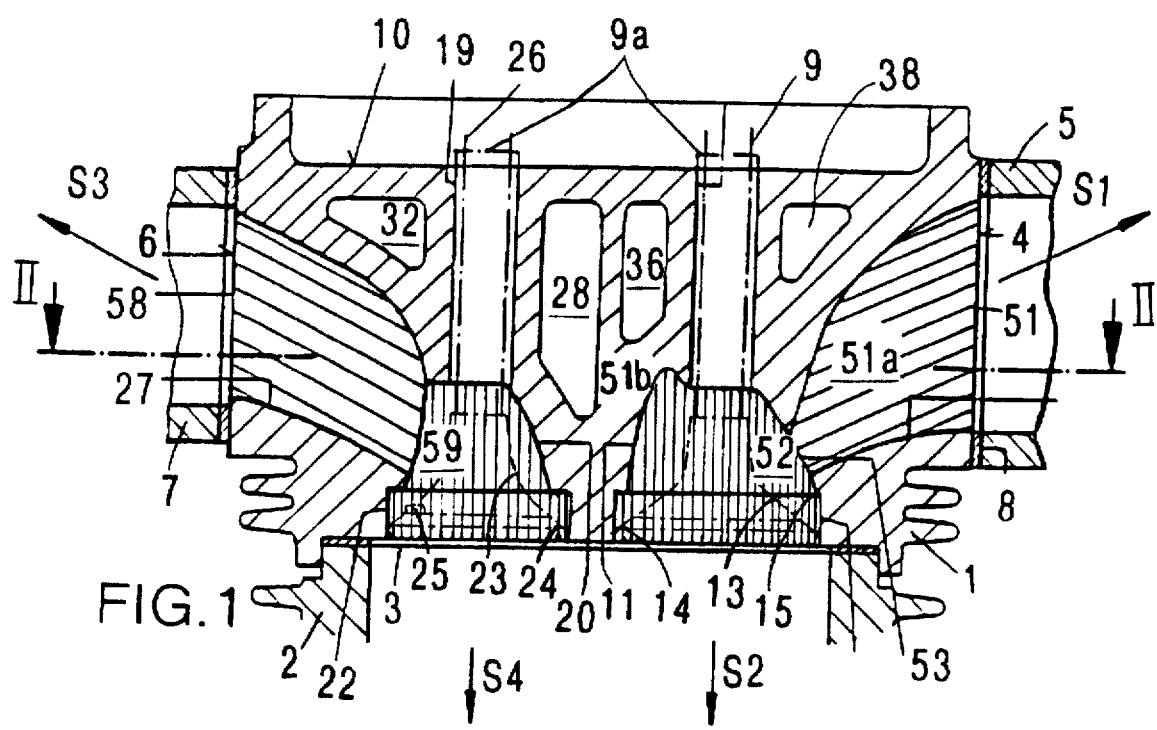

United States Patent
Absenger

[19]

[11] Patent Number: 5,713,329
[45] Date of Patent: Feb. 3, 1998

[54] SINGLE CYLINDER DIESEL ENGINE

[75] Inventor: Erich Absenger, Passau, Germany

[73] Assignee: Motorenfabrik Hatz GmbH & Co. KG., Ruhstorf/Rott, Germany

[21] Appl. No.: 661,127

[22] Filed: Jun. 10, 1996

[30] Foreign Application Priority Data

Dec. 10, 1993 [DE] Germany ............ 43 42 139.3

[51] Int. Cl.⁶ .................................. F02B 31/00
[52] U.S. Cl. .................................... 123/306
[58] Field of Search .................. 123/306, 308, 123/188.1, 193.2

[56] References Cited

U.S. PATENT DOCUMENTS

| | | | |
|---|---|---|---|
| 4,406,258 | 9/1983 | Sekiya et al. | 123/306 |
| 4,467,749 | 8/1984 | Maeda | 123/306 |
| 4,469,062 | 9/1984 | Ikegami et al. | 123/306 |
| 4,519,346 | 5/1985 | Nakanishi et al. | 123/306 |
| 4,574,751 | 3/1986 | Sugiyama et al. | 123/306 |
| 4,577,602 | 3/1986 | Showalter | 123/306 |
| 4,919,092 | 4/1990 | Smith, Jr. et al. | 123/306 |
| 5,435,283 | 7/1995 | Zehr | 123/306 |
| 5,558,061 | 9/1996 | Suminski | 123/306 |

*Primary Examiner*—Raymond A. Nelli
*Attorney, Agent, or Firm*—Helfgott & Karas, P.C.

[57] ABSTRACT

A one-cylinder diesel engine with one cylinder head (1) is manufactured as a one-piece die casting; its intake passage (4) for the combustion air comprises a swirl channel (12) which feeds into a swirl chamber (11) situated on the back side of the intake valve (13).

8 Claims, 2 Drawing Sheets

FIG.1

SINGLE CYLINDER DIESEL ENGINE

The present invention relates to a single cylinder diesel engine with a novel cylinder head and a casting mold for producing such a cylinder head.

For such a cylinder head, the shape of the exhaust port is largely not critical from a casting point of view. On the other hand, the intake port for the combustion air requires special casting measures, because a section of this port is constructed as a swirl duct. Such a swirl duct is distinguished by a complex spatial shape in the form of a spiral with the aim of increasing the twist number of the air aspirated during the suction stroke to improve the mixture formed in the combustion space. For this reason, cylinder heads for diesel engines were previously produced by chilled casting or sand casting, sand cores being used to shape the swirl duct and being destroyed once again for removal.

A cylinder head, produced as a one-part casting in the conventional manner for a single cylinder diesel engine, for which the intake port comprises a swirl duct for the combustion air and discharges into a swirl space at the back of the intake valve, is described in the German Offenlegungsschrift DE-A-1426010.

The production of such a cylinder head with a swirl duct by the less expensive die casting method, for which the cores are pulled after the casting, was previously considered to be impossible by the experts because of the complex construction of the swirl duct.

In the case of a known diecasting mold (JP-A-61229962) for producing a one-piece cylinder head, cylindrical intake and outlet ports are provided, which are formed in a simple manner by means of metal cores, which are pulled in a linear direction of the casting process.

According to the path taken by the present invention, it is possible for the first time to produce a cylinder head of the aforesaid type as a one-piece diecasting part. In the direction of the cylinder axis, the swirl duct broadens increasingly towards the outside on both sides of a reference line, which is formed by a tangent at a core part of the cylinder head, around which the swirl duct is looped and which contains the valve stem of the inlet valve and passes through the intersection of the outer contour of the swirl duct and the base circle of the swirl space, which adjoins the valve seat borehole and into which the swirl duct discharges. For the inventively proposed shape of the swirl duct, the outer contour of the latter, once again seen in the direction of the cylinder axis, is somewhat extended in comparison with the known constructions. However, a slightly lower twist number, arising from this, can be accepted in view of the possibly lower manufacturing cost resulting from the use of the diecasting method. In this connection, it is a question of achieving not only cost advantages, but also weight advantages, owing to the fact that the cylinder heads can be produced with a greater dimensional accuracy than can one-piece castings from aluminum alloy. Moreover, the dimensional accuracy meets all the requirements with regard to the course of the combustion processes in the combustion space and also with regard to the fuel consumption.

An inventive casting mold for producing a one-piece cylinder head for a single cylinder diesel engine with one inlet port for the combustion air and one outlet port for the exhaust gas comprises the distinguishing features —that a diecasting mold is used, —that a core consisting of two sliders is provided for shaping the intake port, —that a first slider with a lateral withdrawing direction corresponds essentially to the section of the swirl duct leading to the outside and —that a second slider, with a withdrawing direction parallel to the cylinder axis, corresponds essentially to a swirl space, disposed at the rear of the intake valve, in addition to the inner section of the swirl duct discharging into the swirl space.

With regard to the construction of the two sliders, the invention provides that these adjoin a common separating surface, which is essentially parallel to the cylinder axis. As seen in the direction of the cylinder axis, this separating surface is within the base circle of the swirl space adjoining the valve seat borehole.

Advisably, the separating surface comprises a separating plane, which is approximately parallel to the lateral pulling-out direction and, according to a further development and seen in the direction of the cylinder axis, can extend at a little distance from the internal contour of the swirl duct and can be connected to this over a transverse plane running at right angles to the separating plane. Through the last-mentioned variation, the development of a sensitive, sharp edge on the part of the second slider is avoided in the region of the internal contour of the swirl duct.

In a similar manner, provisions are made that, for shaping the outlet port, a core is used, which consists of two sliders, —a third slider, with a lateral pull-out direction, corresponding essentially to a duct section with a linear flow axis discharging to the outside —a fourth slider with a pull-out direction extending parallel to the cylinder axis, corresponding essentially to an exhaust gas space, which is disposed on the back of the outlet valve and from which the duct section discharges.

With respect to the shape of the outlet duct, provisions are furthermore made that the inner end of the duct section semicircularly encloses a core part of the cylinder head containing the valve stem of the outlet valve.

During the manufacture of the cylinder head as a diecast part, a further problem arises in that several cavities for the air cooling, which are separated by ribs, must communicate with one another in the region of the cylinder head, so that the cooling air can be distributed uniformly.

In order to ensure this, provisions are furthermore made pursuant to the invention that rod-shaped mold cores are present, which can be pulled out parallel to the cylinder axis through the top of the cylinder head and with which openings in ribs separating the adjacent cooling air ducts are produced. With such preferred cylindrical mold cores, it is possible to place openings in the region of the rib projection, which make an effective flow about the cylinder head and the confluence of the cooling air from the individual cooling air ducts possible. The boreholes in the top of the cylinder head, required for pulling the rod-shaped mold cores, are advisably closed off gas-tight by a screw-type cap or by pressing in sealing bodies.

In the region of the separating surfaces between the two cores of the intake port as well as the outlet port, weak edges, which do not interfere at least in the outlet port, are formed in the wall regions of these two ports; optionally, however, it may be advantageous to remove such edges in the intake port by subsequent machining.

The present invention represents a further advance in the production of relatively inexpensive small diesel engines, for which there is a particular industrial demand, for example, for engines with a power output up to 3 kW.

In the following, an example is explained by means of the drawing, in which

Figure 2:
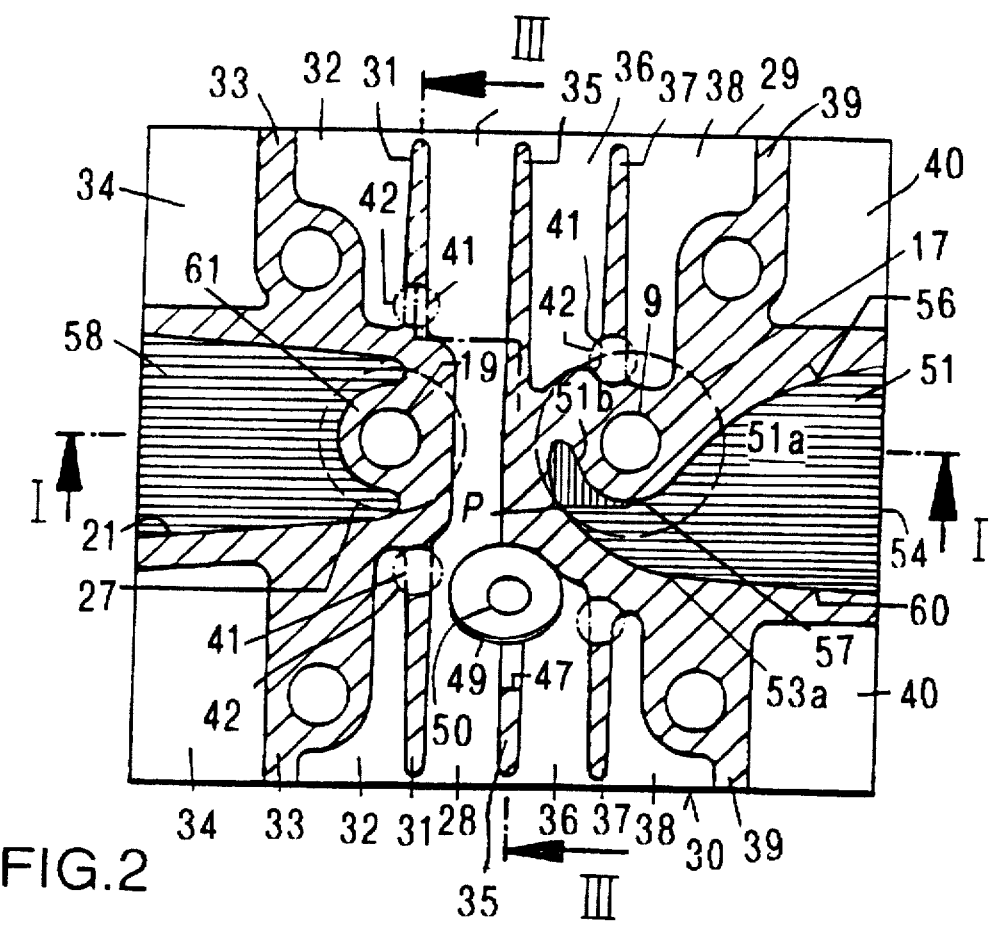
Figure 3:
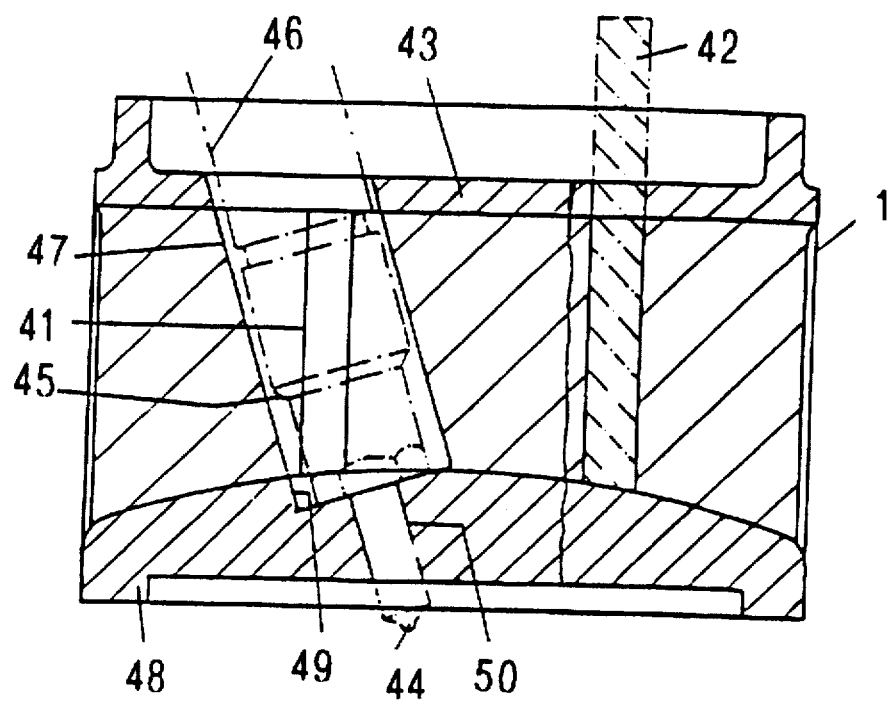

FIG. 1 shows a partial section along I—I of FIG. 2, parallel to the cylinder axis and through a single cylinder diesel engine in the region of the cylinder head, FIG. 2 shows a section along II—II of FIG. 1 and FIG. 3 shows a section along III—III of FIG. 2.

FIGS. 1 to 3 in each case show sectional representations through the cylinder head 1 of a single cylinder diesel engine, the cylinder head 1 being constructed so that it can be produced by diecasting. Below the cylinder head 1 of FIG. 1, the upper end of the cylinder 2 is still shown with the cylinder head seal 3 disposed between the two parts. Moreover, a connecting line 5 for the combustion air is drawn on the side of the inlet port 5 and the exhaust gas manifold 7 is drawn on the side of the outlet port 6, in each case as a pipe section. The connecting line 5 and the exhaust gas manifold 7 both are connected gas-tight over an appropriate ring seal 8 to the corresponding side walls of the cylinder head 1.

A borehole 9, which is parallel to the cylinder axis and into which a valve-guiding sleeve 9a is pressed, connects the upper side 10 of the cylinder head with a swirl space 11, in which a swirl duct 12 for the air inlet discharges. In the interior of the swirl space 11, the intake valve 13 with its valve seat 14 is located below a valve seat ring 15, the intake valve 13 as well as the valve seat ring 15 being indicated by lines of dots and dashes. The valve seat ring 15 is fitted into a valve seat borehole 16, which is connected to the swirl space 11 with its base circle 17. The content of the swirl space 11 and the valve seat borehole 16 is indicated by the shading parallel to the cylinder axis. Within the borehole 9, the valve guide sleeve 9a and the valve stem 18 of the intake valve are also indicated by lines of dots and dashes.

A further borehole 19, parallel to the cylinder axis, connects the upper side 10 of the cylinder head 1 with an exhaust gas space 20, the base circle 21 of which adjoins the upper end of the valve seat borehole 22 for the outlet valve 23. In the closed position of the outlet valve 23 shown, the valve seat 24 of the outlet valve 23 lies from below against the valve seat ring 25, which is fitted into the valve seat borehole 22. The valve seat ring 25, the outlet valve 23, the valve guide sleeve 9a and the valve stem 26 of the outlet valve 23 are indicated with lines of dots and ashes. The inner end of the duct section 27 of the outlet port 6 discharges into the exhaust gas space 20.

As can be seen better in FIG. 2, the cylinder head 1 has a central air duct 28, which runs continuously from one end face 29 to the opposite end face 30 of the cylinder head 1. Further air ducts adjoin on either side of the central air duct 28. They are formed between ribs, on the left there being a rib 31, an air duct 32, a further rib 33 and a corner section 34 and, to the right, there being a rib 35, an air duct 36, a further rib 37, a further air duct 38, a further rib 39 and a corner section 40. The corresponding components may also be found on the opposite end face 29 of the cylinder head 1; for the sake of clarity, they have been given the same reference symbols, although slight dimensional deviations can be recognized. Although the air ducts 32, 28, 36, 38 between the two end faces 29, 30 of the cylinder head 1 are continuous, even if partly only with greatly reduced cross sections, it is advisable, within the sense of improved air cooling, to make it possible to flush around the hot inner core parts of the cylinder head 1 by virtue of the fact that openings 41 are molded at the inner end of the ribs 31. This is accomplished in casting technology, by providing, as shown in FIG. 3, rod-shaped mold cores 42, which are pulled after the casting, so that these openings 41 are formed in the region of the ribs 31, 37. The rod-shaped mold cores 42 are also indicated in FIG. 2 by circles of dots and dashes. The mold cores 42 are pulled out through the top 43 of the cylinder head 1, after which the boreholes, remaining in the top 43, are closed off gas tight by introducing a sealing body (not shown). Furthermore, the injection nozzle 44 with cap nut 45 and nozzle holder 46 are drawn in FIG. 3 by lines of dots and dashes within a section 47 of the rib 35. Accordingly, the seat 49 for the cap nut 45 of the injection nozzle 44, produced subsequently by milling, as well as the housing borehole 50, in which they pass through the bottom part 48, can be seen in the bottom part 48 of the cylinder head 1.

Finally, the cores for the inlet port 4 and the outlet port 6, consisting each of two sliders, are drawn in FIGS. 1 and 2. The inlet port 4 comprises a first slider 51 with shading, which runs obliquely upwards to the right and essentially forms the swirl duct 12, as well as a second slider 52, which corresponds essentially to the swirl space 11. Both sliders 51, 52 are pulled out in a direction parallel to their shading and indicated by arrows S1 and S2. They have a common separating surface 53, which comprises a separating plane 53a, which runs parallel to the pulling-out direction S1 and at a small distance from the core part 55 of the cylinder head, around which the swirl duct 12 is coiled. The distance of the separating plane 53a from this core part 55 or the inner contour 56 of the swirl duct 12 is bridged by a narrow transverse plane 57, running perpendicularly to the separating plane 53a. In this way, a pointed inner end of the second slider 52 is avoided. The slider 51 corresponds essentially to an outer section 51a of the swirl duct 12, of which the inner section 51b, drawn in FIG. 2, must be added to the second slider 52, since otherwise the first slider 51 could not be pulled out of the casting.

The configuration of the slider is simpler for the outlet port 6 than for the swirl-producing intake port 4. A third slider 58 serves for molding the outer duct section 27 of the intake port 6. The third slider 58 adjoins a fourth slider 59, which corresponds to the shell mold of the exhaust gas space 20. The slider 59 is pulled parallel to the cylinder axis in the pull-out direction of arrow S4. The third slider 58 is pulled laterally upwards in the direction of its shading, as indicated by arrow S3.

From the plan view of FIG. 2, it can be seen that the innermost point P of the first slider 51, forming the swirl duct 12, is fixed by the intersection of the outer contour 60 of the swirl duct 12 and the base circle 17 of the swirl space 11. The point P at the same time forms the innermost point of the first slider 51.

I claim:

1. A single cylinder diesel engine with a cylinder head (1), the intake port (4) of which comprises a swirl duct (12) for the combustion air, which discharges into a swirl space (11) at the back of the intake valve (13), characterized in that the cylinder head is constructed as a one-piece diecast part and in that the swirl duct (12), viewed in the direction of the cylinder axis, becomes increasingly wider towards the outside on both sides of a reference line, which is formed by a tangent (54) at a core part (55) of the cylinder head (1), around which the swirl duct (12) is looped and which contains the valve stem (18) of the inlet valve (13), the tangent passing through the intersection (P) of the outer contour (60) of the swirl duct (12) with the base circle (17) of the swirl space (11), which adjoins the valve seat borehole (16) and into which the swirl duct (12) discharges.

2. A casting mold for producing a one-piece cylinder head (1) for the single cylinder diesel engine of claim 1, with an intake port (4) for the combustion air and an outlet port (6) for the exhaust gas, the intake port comprising a swirl duct (12), which discharges into a swirl space (11) disposed at the back of the intake valve (13), a diecasting mold being used, characterized in that a core consisting of two sliders is provided for shaping the intake port (4), a first slider (51) with a lateral withdrawing direction (S1) corresponds essentially to the section (51a) of the swirl duct (12) leading to the outside and a second slider (52), with a withdrawing direction (S2) parallel to the cylinder axis, corresponds essentially to a swirl space (11), disposed at the rear of the intake valve (13), in addition to the inner section (51b) of the swirl duct (12) discharging into the swirl space (11).

3. The casting mold of claim 2, characterized in that the two sliders (51, 52) adjoin a common separating surface (53), which runs essentially parallel to the cylinder axis.

4. The casting mold of claim 3, characterized in that the separating surface (53) encompasses a separating plane (53a) approximately parallel to the lateral pulling-out direction (S1).

5. The casting mold of claim 4, characterized in that the separating plane (53a), seen in the direction of the cylinder axis, is a small distance from the internal contour (56) of the swirl duct (12) and connected to the latter over a transverse plane (57), which is perpendicular to the separating plane (57).

6. The casting mold of claim 2, characterized in that a core, consisting of two additional sliders (58, 59), is provided to mold the outlet port (6), a third slider (58) with a lateral pull-out direction (S3) corresponds essentially to a duct section (27) with a linear flow axis discharging to the outside and a fourth slider (59), with a pull-out direction (S4) parallel to the cylinder axis, corresponds essentially to an exhaust gas space (20), which is disposed at the back of the outlet valve (23) and from which the duct section (27) discharges.

7. The casting mold of claim 6, characterized in that the inner end of the duct section (27) semicircularly embraces a core part (61) of the cylinder head (1), containing the valve stem (26) of the outlet valve (23).

8. The casting mold of claim 2, characterized in that rod-shaped mold cores (42) are provided, which can be pulled out through the top (43) of the cylinder head (1) and with which openings (41) in ribs (31; 37), separating adjacent cooling air ducts (28, 31, 36, 38) from one another, can be produced.

* * * * *

UNITED STATES PATENT AND TRADEMARK OFFICE
CERTIFICATE OF CORRECTION

PATENT NO. : 5,713,329
DATED : February 3, 1998
INVENTOR(S) : Erich Absenger

It is certified that error appears in the above-identified patent and that said Letters Patent is hereby corrected as shown below:

On the title page, insert the following item [63]:

Related U.S. Application Data
[63] Continuation of PCT/IB94/00222    7/21/94

Column 1,
Line 2 of the specification, insert the following:
This application is a continuation of PCT/IB94/00222 filed on July 21, 1994.

Signed and Sealed this

Third Day of July, 2001

*Attest:*

*Attesting Officer*

NICHOLAS P. GODICI
*Acting Director of the United States Patent and Trademark Office*